J. D. McINTYRE.
APPARATUS FOR DRYING MILK.
APPLICATION FILED AUG. 1, 1913.
1,122,142.
Patented Dec. 22, 1914.
2 SHEETS—SHEET 1.
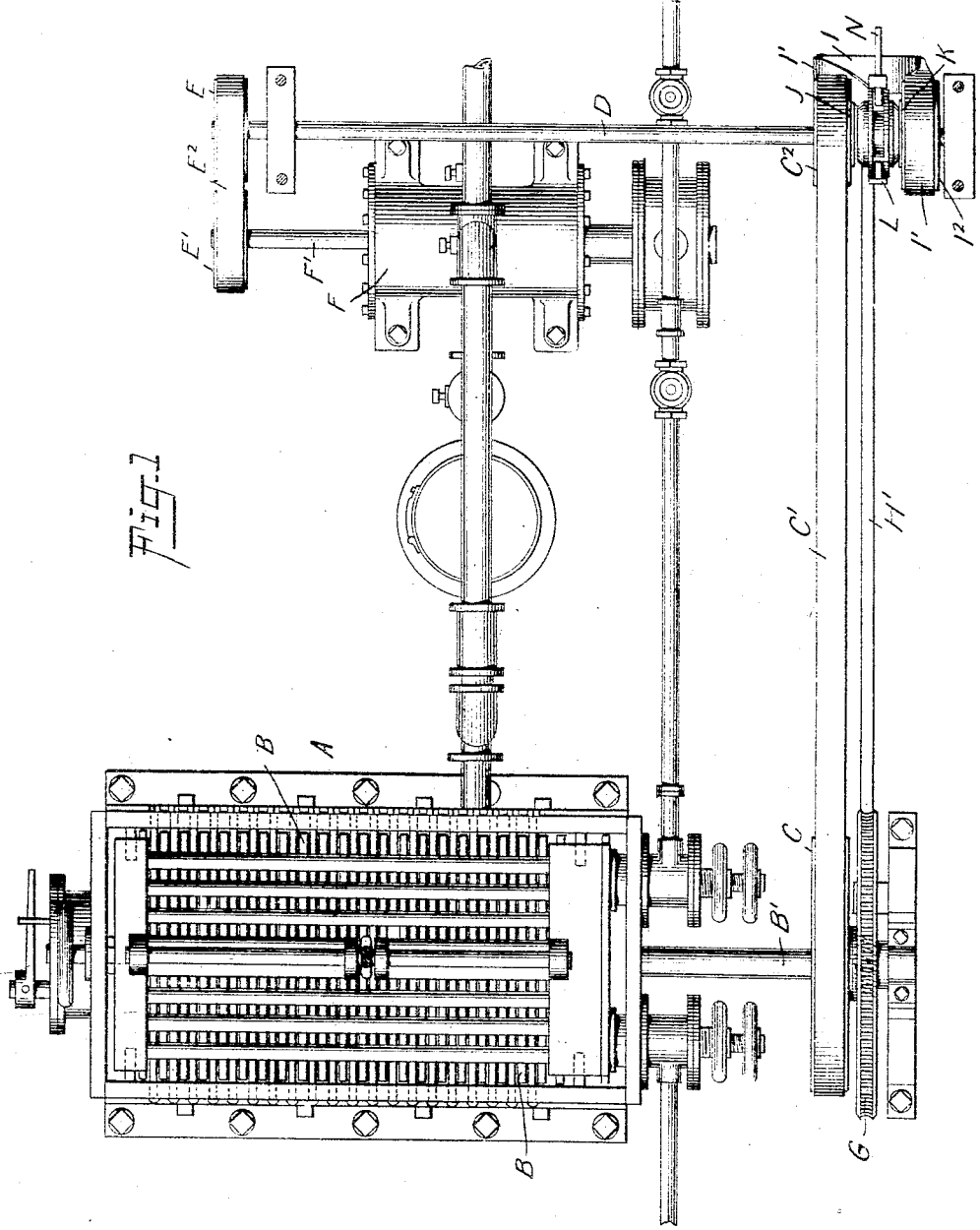
WITNESSES
INVENTOR
JOHN D. McINTYRE
BY
ATTORNEYS J. D. McINTYRE.
APPARATUS FOR DRYING MILK.
APPLICATION FILED AUG. 1, 1913.
1,122,142.
Patented Dec. 22, 1914.
2 SHEETS—SHEET 2.
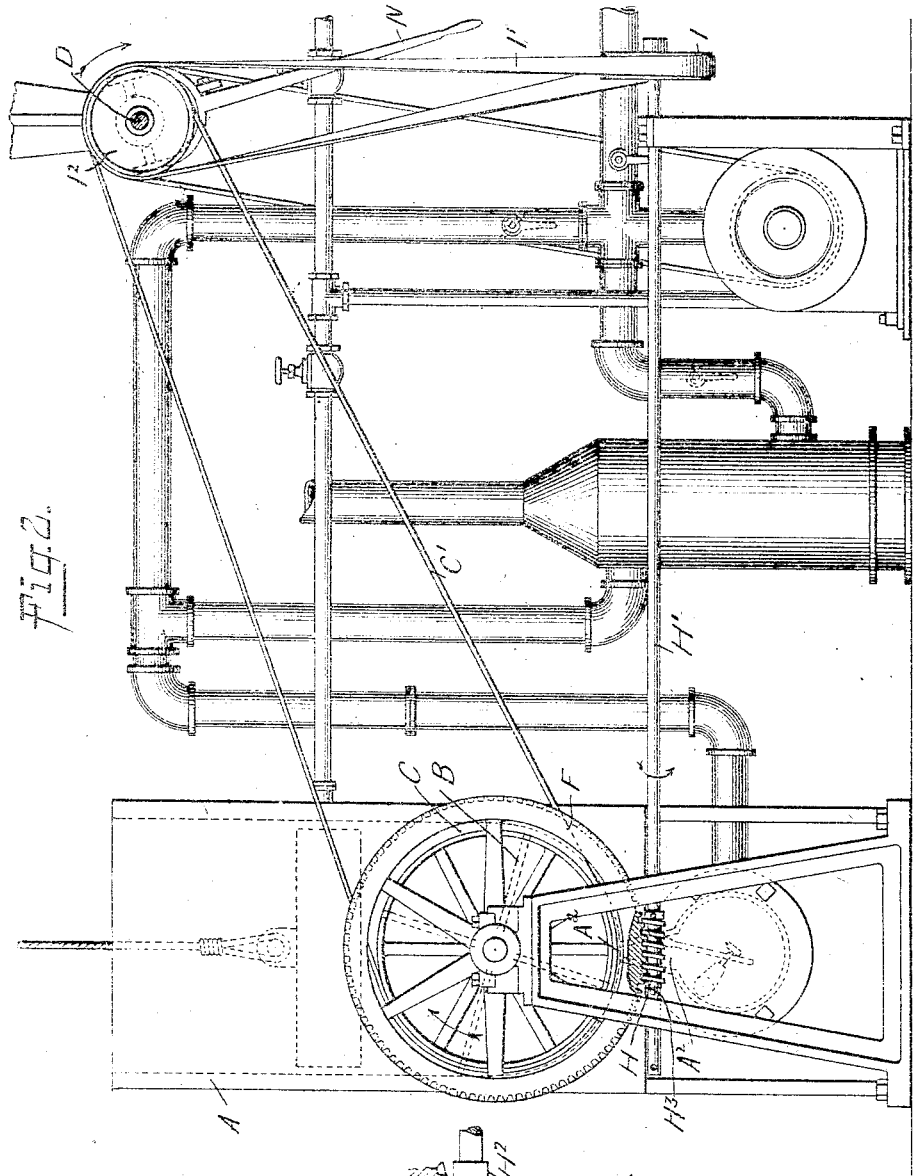
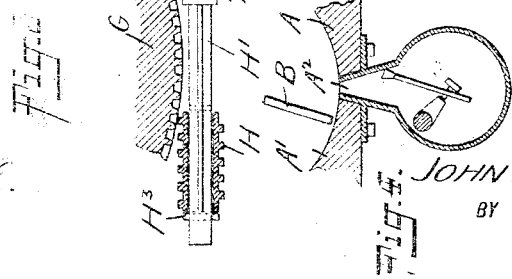
WITNESSES
INVENTOR
JOHN D. McINTYRE
BY Munn & Co
ATTORNEYS

UNITED STATES PATENT OFFICE.

JOHN D. McINTYRE, OF NEW YORK, N. Y., ASSIGNOR TO WILLIAM DE SHETLEY, OF CHICAGO, ILLINOIS.

APPARATUS FOR DRYING MILK.

1,122,142.  Specification of Letters Patent.  Patented Dec. 22, 1914.

Application filed August 1, 1913. Serial No. 782,441.

*To all whom it may concern:*

Be it known that I, JOHN D. MCINTYRE, a citizen of the United States, and a resident of the city of New York, borough of Brooklyn, in the county of Kings and State of New York, have invented new and useful Improvements in Apparatus for Drying Milk, of which the following is a full, clear, and exact description.

The invention relates to the method and apparatus for drying milk, such as shown and described in the Letters Patent of the United States, No. 1,026,756 and No. 1,026,757, granted to John McIntyre, May 21, 1912.

The object of the invention is to provide certain new and useful improvements in apparatus for drying milk of the type mentioned whereby the drying of the milk on a commercial scale is rendered practicable by continually rotating the agitator, first at a high rate of speed until the milk nears a thick or doughy consistency, and then rotating the agitator with a decreased rate of speed and a corresponding increase in power during the next period of changing the milk from a doughy consistency to granular form.

In order to accomplish the desired result use is made of a driving gear connected with the agitator shaft to rotate the agitator continually at a high rate of speed during the period of changing the milk to a doughy consistency, and to rotate the said agitator shaft at a decreased speed and a corresponding increase of power during the period of changing the milk from a doughy consistency into granular form.

A practical embodiment of the invention is represented in the accompanying drawings forming a part of this specification, in which similar characters of reference indicate corresponding parts in all the views.

Figure 1 is a plan view of the apparatus for drying milk provided with the improvements; Fig. 2 is a side elevation of the same; Fig. 3 is an enlarged sectional side elevation of the worm and worm shaft, with the worm out of engagement with the worm wheel; and Fig. 4 is a sectional side elevation of the vessel, air induction port and air chamber for supplying heated air.

In manufacturing dry milk on a commercial scale by the method and apparatus shown and described in the Letters Patent above referred to, it has been found that the pulleys and belt connecting the engine shaft with the agitator shaft for rotating the agitator during the doughy stage of the operation are wholly inadequate. This is due to the fact that in making dry milk on a commercial scale a large vessel is needed to accommodate a large amount of milk at a time, and a correspondingly large sized agitator is needed to agitate the milk, and when the milk reaches a doughy consistency the mass becomes tenacious and offers so much resistance to the driving means employed for rotating the agitator that the latter ceases to rotate and as a consequence the milk becomes spoiled. By using a pulley and belt connection between the engine shaft and the agitator shaft during the doughy state of the operation, the belt either slips on the pulleys and the agitator ceases to rotate or the spokes or blades of the agitator are broken off and the agitator rendered incapable of performing its proper function. It is understood that in making dry milk under the process set forth in the patents above mentioned it is imperative that the milk does not become dormant for any great length of time at any stage of the operation as dormancy of the milk if continued more than ten minutes causes fermentation to set in and the introduced heated air tends to bake the milk with the result that the whole batch is spoiled. Thus it is necessary that the milk is kept agitated without interruption for any great length of time in order to produce perfect dry milk. In order to produce the desired result it has been found, in practice, that the agitator should run at a high rate of speed during the early stages of the operation and at a low speed and with correspondingly increased power during the next stages until the milk crumbles to insure the production of commercially salable dry milk.

The vessel or tank A for containing the milk to be treated is preferably rectangular in shape, open at the top and provided with a semicircular bottom A' having an air induction port A² preferably extending throughout the length of the bottom and preferably at the lowest portion thereof, the said air induction port serving for introducing heated air under pressure into the milk contained in the vessel or tank A, as more fully described in the patents above referred to so that further description of the same is not deemed necessary.

In the bottom portion of the vessel A is mounted to turn an agitator, breaker or stirrer B having its shaft B' journaled in suitable bearings in the ends of the vessel A, and on the outer end of the shaft B' is secured a pulley C connected by a belt C' with a pulley C² loose on a counter-shaft D driven by pulleys E, E' and a belt E² from the shaft F' of an engine F or other motor. On the outer end of the shaft B' is secured a worm wheel G in mesh with a worm H mounted to rotate with and to slide on a longitudinally-extending worm shaft H' journaled in suitable bearings and provided with a pulley I connected by a belt I' with a pulley I² mounted to rotate loosely on the counter-shaft D adjacent the pulley C². The opposite faces of the loose pulley C² and the pulley I² are provided with clutch members J and K adapted to be engaged by a clutch L mounted on the counter-shaft D to turn with the same and to slide thereon by the direction of the axis of the shaft by the use of a key and key-way on the clutch L and counter-shaft D respectively. A shifting lever N is connected with the clutch L to shift the same lengthwise on the counter-shaft D with a view to move the clutch L into engagement with either clutch member J or K. The worm H is connected by key and key-way with the worm shaft H' to allow the worm H to slide lengthwise on the worm shaft H' with a view to be out of mesh with the worm wheel G during the time the agitator B is driven at a high speed by way of the belt C' and pulley C, as hereinafter more fully described. When the agitator B is to be rotated at a low speed and with an increase of power then the operator by giving a few turns to the worm shaft H' and pushing the worm to the right causes the latter to move back into engagement with the worm wheel G to allow of driving the agitator B by means of the worm H and worm wheel G. The worm shaft H' is provided with a thrust collar H² for the worm H to abut against and the worm shaft is provided with a removable pin H³ adapted to be slipped in place after the worm has moved into mesh with the worm wheel G. This pin H³ is removed to allow the worm to move out of mesh with the worm wheel G (see Figs. 2 and 3).

The operation is as follows: The milk is poured into the vessel A while the air blast is turned on and the agitator B is rotated from the counter-shaft D by means of the pulley C², belt C', pulley C and clutch L now in engagement with the clutch member J. By the arrangement described the agitator B is rotated at a high rate of speed so that the milk and the entering hot air are agitated to insure a very intimate commingling of the heated air and the milk. The air is passed into the milk at about a temperature of 216° F. and this is maintained during about three-fifths of the whole time required for obtaining the product, and during the first two periods of the process the milk is first concentrated to a thick milk consistency and subsequently to a doughy consistency. At about the time the milk nears a doughy consistency the operator shifts the lever N so as to move the clutch L out of engagement with the clutch member J. The worm H is now engaged with the worm wheel G, as previously described, and then the clutch L is shifted farther and into engagement with the clutch member K so that the shaft B' and the agitator B are now rotated at a low rate of speed and with a correspondingly increased power by means of the worm H and worm wheel G. During the period of reducing the milk to a doughy consistency the air is introduced at a temperature of about 190° F. and the period lasts about one-fifth of the whole time of the process. It will be noticed that as the temperature of the air is reduced a corresponding reduction in the speed of the agitator B can be had without danger of baking the milk especially as the milk is kept constantly agitated and no particle thereof is liable to become dormant. From the doughy state of the milk until the latter crumbles the temperature of the heated air is kept at 190° and the state of crumbling is reached in about one-tenth of the time of the whole process. After the milk has crumbled the clutch L is moved out of mesh with the clutch member K and back into mesh with the clutch member J to again drive the agitator B at a high rate of speed to stir the crumbled milk into granules and powder and to dry the same in order to render the dry granules fit for grinding into powder form. During this stage the heated air is passed into the milk at 170° F., and this last stage of the process takes about one-tenth of the time of the whole process. At the end of the last period of the process the air is shut off and the agitator B is stopped by shifting the clutch L from the active position into intermediate position to allow removing the product from the vessel, the product being now in condition for grinding.

From the foregoing it will be seen that by the arrangement described the driving gear rotates the agitator B continually at a high rate of speed during the period of changing the milk to a doughy consistency and rotates the agitator at a decreased speed and a corresponding increase in power during the period of changing the milk from a doughy consistency to granular form.

It is understood that the change in speed is quickly made so that the rotation of the agitator B is interrupted but a very short time (a minute or two), that is, a period not sufficient to injuriously affect the final product.

Having thus described my invention, I claim as new and desire to secure by Letters Patent:

1. In an apparatus for drying milk the combination of a vessel for containing the milk and having a slot in the bottom, a hot air supply connected with the said slot, a revoluble agitator in the said vessel, and a double driving means connected with the said agitator and having a friction drive and a positive drive to rotate the agitator by the said friction drive at a high rate of speed during the period of changing the milk until it nears a doughy consistency and to subsequently rotate the said agitator by the said positive drive at a decreased speed and a corresponding increase of power during the period of changing the milk from a doughy consistency into granular form.

2. In an apparatus for drying milk the combination of a vessel for containing the milk and having a slot in the bottom, a hot air supply connected with the said slot, a revoluble agitator in the said vessel, a high-speed friction driving means connected with the said agitator for rotating the latter at a high rate of speed during the period of changing the milk until it nears a doughy consistency, and a low speed powerful positive driving means for the said agitator to subsequently rotate the agitator at a low speed and with an increase in power during the period of changing the milk from a doughy consistency into granular form.

3. In an apparatus for drying milk, the combination of a vessel for containing the milk, a hot air supply connected with the said vessel, a revoluble agitator in the said vessel, a pulley and belt driving means for driving the said agitator at a high rate of speed during the period of changing the milk until it nears a doughy consistency, and a worm wheel and worm driving means for subsequently driving the said agitator at a low speed and with an increase in power during the period of changing the milk from a doughy consistency into granular form.

4. In an apparatus for drying milk, the combination of a vessel for containing the milk, a hot air supply connected with the said vessel, a revoluble agitator in the said vessel and having a shaft extending to the outside of the said vessel, a driven shaft, a pulley and belt connection between the outer end of the said agitator shaft and the said driven shaft, the pulley on the driven shaft being loose, a worm wheel on the outer end of the said agitator shaft, a worm in mesh with the said worm wheel and provided with a worm shaft, a pulley and belt connection between the said driven shaft and the said worm shaft, the pulley of this connection being loose on the driven shaft, and a clutch mechanism rotating with the said driven shaft and adapted to engage either of the said loose pulleys.

5. In an apparatus for drying milk, the combination of a vessel for containing the milk, a hot air supply connected with the said vessel, a revoluble agitator in the said vessel and having a shaft extending to the outside of the said vessel, a driven shaft, a pulley and belt connection between the outer end of the said agitator shaft and the said driven shaft, the pulley on the driven shaft being loose, a worm wheel on the outer end of the said agitator shaft, a worm shaft, a worm slidable on the said worm shaft to engage or disengage the said worm wheel, a pulley and belt connection between the said driven shaft and the said worm shaft, the pulley of this connection being loose on the driven shaft, and a clutch mechanism rotating with the said driven shaft and adapted to engage either of the said loose pulleys.

In testimony whereof I have signed my name to this specification in the presence of two subscribing witnesses.

JOHN D. McINTYRE.

Witnesses:
 THEO. G. HOSTER,
 PHILIP D. ROLLHAUS.